US008723484B2

(12) United States Patent
Sun et al.

(10) Patent No.: US 8,723,484 B2
(45) Date of Patent: May 13, 2014

(54) METHOD AND APPARATUS FOR CONTROLLING CHARGING AND DISCHARGING OF A BATTERY USED IN A BASE STATION (75) Inventors: Shuxing Sun, Shanghai (CN); Xuehai Chen, Shanghai (CN); Hui Ni, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 317 days.

(21) Appl. No.: 13/086,045

(22) Filed: Apr. 13, 2011

(65) Prior Publication Data
US 2011/0199052 A1 Aug. 18, 2011

Related U.S. Application Data (63) Continuation of application No. PCT/CN2009/074369, filed on Oct. 9, 2009.

(30) Foreign Application Priority Data

Oct. 13, 2008 (CN) .......................... 2008 1 0167580

(51) Int. Cl.
*H02J 7/00* (2006.01)
(52) U.S. Cl.
USPC ......................................... 320/128; 320/132
(58) Field of Classification Search
CPC ...................................................... Y02E 60/12
USPC ................................................. 320/128, 132
See application file for complete search history.

(56) References Cited

U.S. PATENT DOCUMENTS

| 2003/0094927 | A1 | 5/2003 | Pavlovic et al. | |
|---|---|---|---|---|
| 2005/0174094 | A1* | 8/2005 | Purdy et al. | 320/134 |
| 2009/0243391 | A1* | 10/2009 | Susong et al. | 307/66 |
| 2013/0249481 | A1* | 9/2013 | Jacobs et al. | 320/108 |
| 2013/0278206 | A1* | 10/2013 | Won et al. | 320/108 |

FOREIGN PATENT DOCUMENTS

| CN | 101237160 A | | 8/2008 |
|---|---|---|---|
| CN | 101055995 A | | 10/2011 |
| GB | 2 273 614 | * | 6/1994 |
| GB | 2273614 A | | 6/1994 |
| JP | 2004120855 A | | 4/2004 |
| JP | 2004153912 A | | 5/2004 |

OTHER PUBLICATIONS

Office Action issued in corresponding Chinese Patent Application No. 200810167580.8, mailed Apr. 2, 2011.
Written Opinion of the International Searching Authority issued in corresponding PCT Patent Application No. PCT/CN2009/074369, mailed Jan. 14, 2010.
International Search Report issued in corresponding PCT Patent Application No. PCT/CN2009/074369, mailed Jan. 14, 2010.
Extended European Search Report issued in corresponding European Patent Application No. 09820234.4, mailed Jun. 4, 2012.

* cited by examiner

*Primary Examiner* — Drew A Dunn
*Assistant Examiner* — Nathaniel Pelton
(74) *Attorney, Agent, or Firm* — Brinks Gilson & Lione (57) ABSTRACT A method and a apparatus for controlling charging and discharging of a battery used in the base station are provided. The method includes the following steps: obtaining configuration parameters in the base station that are used for controlling the charging and the discharging of the battery used in the base station, and controlling the charging and the discharging of the battery used in the base station according to current time and the configuration parameters.

12 Claims, 6 Drawing Sheets

METHOD AND APPARATUS FOR CONTROLLING CHARGING AND DISCHARGING OF A BATTERY USED IN A BASE STATION

CROSS-REFERENCE TO RELATED APPLICATIONS

This application is a continuation of International Application No. PCT/CN2009/074369, filed on Oct. 9, 2009, which claims priority to Chinese Patent Application No. 200810167580.8, filed on Oct. 13, 2008, both of which are hereby incorporated by reference in their entireties.

FIELD OF THE INVENTION

The present invention relates to the field of communications technologies, and in particular, to a method and an apparatus for controlling charging and discharging of a battery used in a base station.

BACKGROUND OF THE INVENTION

The energy source problem increasingly becomes the most important thing focused around the world. However, currently, for a large scale of base stations of current mobile operators, no matter what time range it is, power utilization of the base stations completely depends on their own operation, which may not conform to guidance of the policy of saving the power and further greatly increases the electricity consumption cost of the operators.

Figure 1:
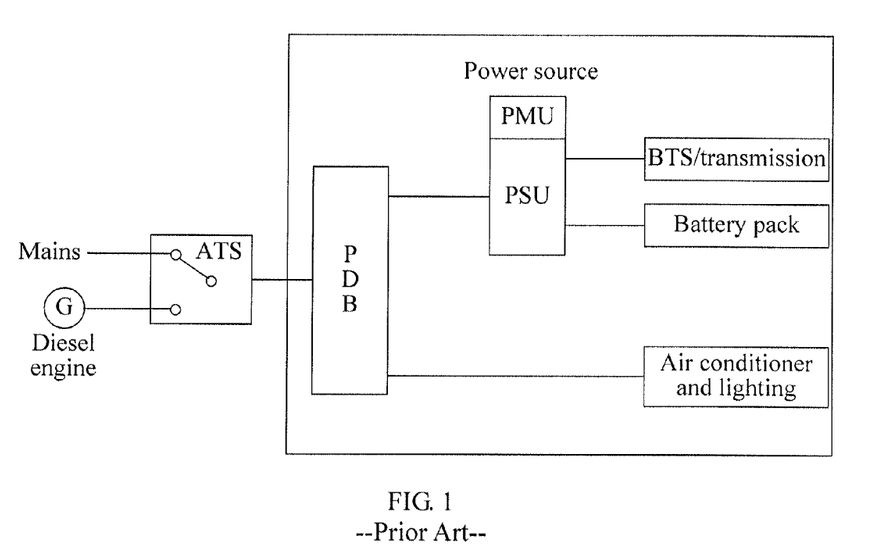
FIG. 1 is a schematic diagram of controlling charging and discharging of a battery used in a base station in the prior art.

FIG. 1 is a schematic diagram of controlling charging and discharging of a battery used in a base station in the prior art. As shown in FIG. 1, a mains supply or a diesel engine is connected with a Power Distribution Box (PDB) through an automatic transfer system (ATS), and the PDB allocates the current received from the ATS into power utilization systems such as a power supply, an air conditioner, and lighting. The power supply is formed by a Power Management Unit (PMU) and a Power Supply Unit (PSU), and the current reaching the power supply is further sent to a Base Transceiver (BTS)/transmission station and a battery pack, and charges the battery pack. When the mains supply is abnormally powered off, a battery or a battery pack (both referred to as a battery for convenience of description) supplies power to the power utilization systems such as the air conditioner and the lighting.

In the prior art, although the base station is equipped with the battery, only a scenario where the battery supplies power to base station equipment when the mains supply is abnormally powered off is considered, that is, charging and discharging states of the battery are mainly controlled by the battery itself according to a difference between the voltage output by the battery and the voltage output by the power supply, so the control method lacks variety, and the electricity consumption cost is increased.

SUMMARY OF THE INVENTION

The embodiments of the present invention provide a method and an apparatus for controlling charging and discharging of a battery used in a base station, which are used to reasonably control charging and discharging states of the battery, so as to reduce the electricity consumption cost.

An embodiment of the present invention provides a method for controlling charging and discharging of a battery used in a base station, where the method includes:

obtaining configuration parameters in a base station that are used for controlling the charging and the discharging of a battery used in the base station; and controlling the charging and the discharging of the battery used in the base station according to current time and the configuration parameters.

An embodiment of the present invention provides an apparatus for controlling charging and discharging of a battery used in a base station, where the apparatus includes:

an obtaining unit, configured to obtain configuration parameters in a base station that are used for controlling the charging and the discharging of a battery used in the base station; and a charging and discharging control unit, configured to control the charging and the discharging of the battery used in the base station according to current time and the configuration parameters obtained by the obtaining unit.

Compared with the prior art, the embodiments of the present invention have the following advantages:

In the embodiments of the present invention, charging and discharging time of the battery used in the base station may be reasonably controlled by obtaining the configuration parameters in the base station that are used for controlling the charging and the discharging of the battery used in the base station, and controlling the charging and the discharging of the battery used in the base station according to current time and the configuration parameters. Therefore, the electricity consumption cost of the base station is reduced.

DETAILED DESCRIPTION OF THE EMBODIMENTS

The detailed description of the present invention is further illustrated in the following with reference to the accompanying drawings and embodiments.

Figure 2:
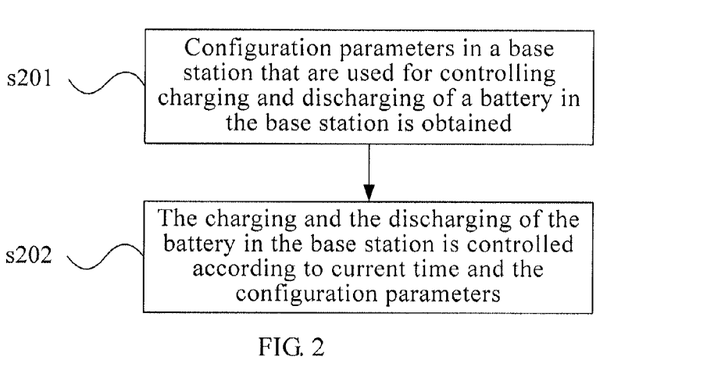
FIG. 2 is a flow chart of controlling charging and discharging of a battery used in a base station according to an embodiment of the present invention.

An embodiment of the present invention provides a method for controlling charging and discharging of a battery used in a base station. As shown in FIG. 2, the method includes the following steps.

Step s201: Configuration parameters in a base station are obtained.

For example, the configuration parameters are used for controlling the charging and the discharging of a battery used in the base station.

Step s202: The charging and the discharging of the battery used in the base station is controlled according to current time and the configuration parameters.

In another embodiment of the present invention, before step s201, the configuration parameters for controlling the charging and the discharging of the battery used in the base station are further required to be configured in advance in the base station. For example, the configuration parameters may include a charge and discharge time range parameter and a charge and discharge depth parameter. For example, the charge and discharge time range parameter includes a first time range and a second time range with different prices of electricity consumption. For example, a price of electricity consumption in the first time range is lower than a price of electricity consumption in the second time range. For example, the charge and discharge depth parameter at least includes a discharge threshold. For example, the base station may complete the step of configuring the parameters according to content received from an operation maintenance center (OMC) platform.

In another embodiment of the present invention, the method for controlling the charging and the discharging of the battery in step s202 may be: charging the battery used in the base station until the battery is full charged, if it is judged that the current time is in the first time range; and controlling the battery used in the base station to supply power until the discharge threshold is reached, if it is judged that the current time is in the second time range, and disconnecting the base station from an external power supply when the battery is supplying power.

In another embodiment of the present invention, besides the current time and the configuration parameters, a state of an ATS may be considered in the control over the charging and the discharging of the battery further. For example, the method for controlling the charging and the discharging of the battery may include: when the state of the ATS represents a type of supplying power by a mains supply, charging the battery used in the base station until the battery is full charged, if it is judged that the current time is in the first time range; and controlling the battery used in the base station to supply power until the discharge threshold is reached, if it is judged that the current time is in the second time range, and disconnecting the base station from an external power supply when the battery is supplying power. In the process, the state of the ATS may be directly detected through a state detection line connected with the ATS. For example, the state of the ATS includes one of types of supplying the power by a mains supply and supplying the power by a diesel engine.

In the embodiments of the present invention, charging and discharging time of the battery used in the base station may be effectively controlled by setting the configuration parameters in the base station, and controlling the charging and the discharging of the battery used in the base station according to current time and the configuration parameters. Therefore, the electricity consumption cost of the base station is reduced.

Following takes an indoor base station as an example to illustrate, a method for controlling charging and discharging of a battery used in the base station according to an embodiment of the present invention.

Figure 3:
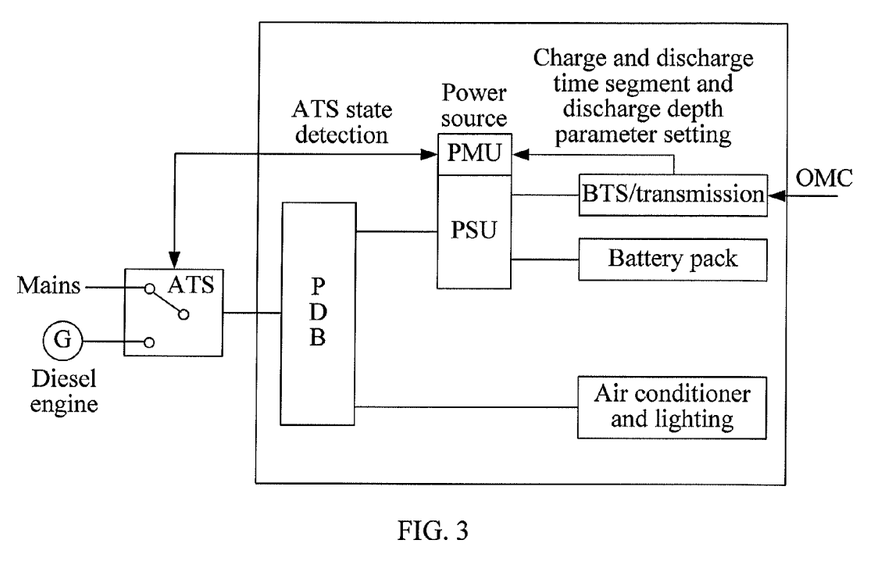
FIG. 3 is a schematic diagram of a networking environment according to an embodiment of the present invention.

A networking environment where the indoor base station is located is shown in FIG. 3. A system (or a base station) for controlling charging and discharging of a battery used in the base station may include an ATS, a PDB, a PMU, a PSU, a BTS, a battery, and a household power utilization system (such as an air conditioner and lighting). The ATS is configured to control the base station to be switched between two states of being supplied with power by a mains supply and being supplied with power by a diesel engine. The PMU is configured to control charging and discharging states of the battery according to current time and preset configuration. An OMC platform may preset, on the PMU, required configuration parameters for controlling the charging and the discharging of the battery used in the base station. The configuration parameters may include a charge and discharge time range parameter and a charge and discharge depth parameter.

Figure 4:
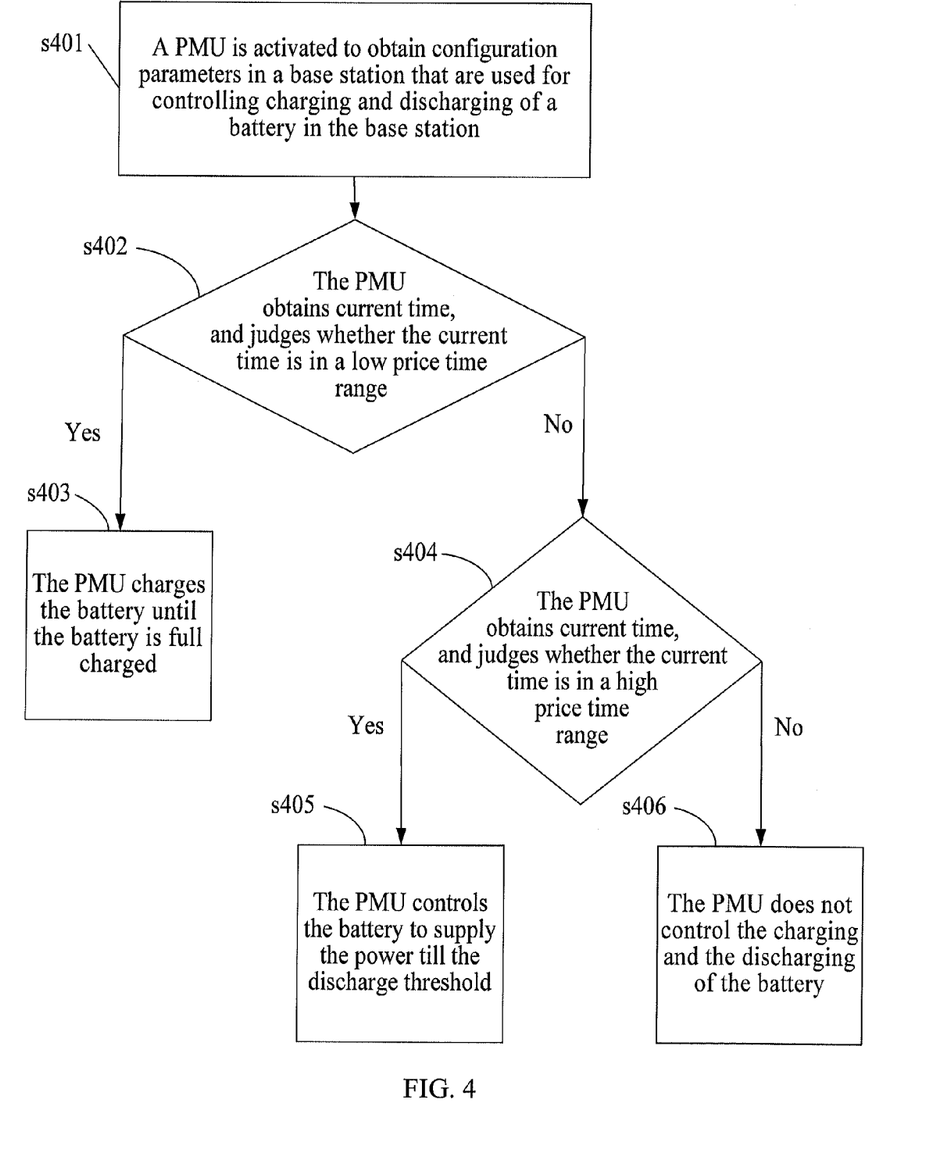
FIG. 4 is a flow chart of a method for controlling charging and discharging of a battery used in a base station according to an embodiment of the present invention.

In another embodiment of the present invention, a method for controlling charging and discharging of a battery used in a base station is shown in FIG. 4.

Step s401: A PMU is activated to obtain configuration parameters.

For example, the configuration parameters are used for controlling the charging and the discharging of the battery used in the base station.

In another embodiment of the present invention, the configuration parameters that are for controlling the charging and the discharging of the battery used in the base station and preset on the PMU include a charge and discharge time range parameter and a charge and discharge depth parameter. The charge and discharge time range parameter may include a plurality of time ranges; for example, the time range may be divided according to the price of electricity consumption. In this embodiment, the charge and discharge time range parameter including a first time range and a second time range is taken as an example, in which the first time range is a low price time range, and the second time range is a high price time range. The charge and discharge depth parameter may include a discharge threshold.

Step s402: The PMU obtains current time, and judges whether the current time is in the low price time range. If the current time is in the low price time range, step s403 is performed; if the current time is not in the low price time range, step s404 is performed.

For example, by judging whether the current time is in the first time range, the PMU judges whether the current time is in the low price time range.

Step s403: The PMU controls to charging the battery until the battery is full charged.

Step s404: The PMU judges whether the current time is in the high price time range. If the current time is in the high price time range, step s405 is performed; if the current time is not in the high price time range, step s406 is performed. For example, by judging whether the current time is in the second time range, the PMU judges whether the current time is in the high price time range.

Step s405: The PMU controls the battery to supply the power until the discharge threshold is reached and the procedure ends. The PMU controls disconnecting the base station from an external power supply when the battery is supplying power.

Step s406: The PMU does not control the charging and the discharging of the battery and the procedure ends.

For example, the battery automatically controls switching between two states of being charged and serving as a power supply to supply the power, according to a difference between the voltage output by the battery and the voltage output by the power supply, and the base station is disconnected from an external power supply when the battery is supplying power.

It should be noted that, in this embodiment, the following parameters are taken as an example to illustrate the method for controlling the charging and the discharging of the battery used in the base station: the charge and discharge time range parameter including the low price time range and the high price time range and the charge and discharge depth parameter including the discharge threshold. However, specific content in the charge and discharge time range parameter and the charge and discharge depth parameter is not limited thereto, and other different parameters may be set as required. For example, further, 24 hours in a day may be further divided into more time ranges or a plurality of charging and discharge thresholds may be set.

In another embodiment of the present invention, an indoor base station is still taken as an example to illustrate a method for controlling charging and discharging of a battery used in the base station according to an embodiment of the present invention. The difference from the previous embodiment lies in that, the PMU controls the charging and the discharging of the battery used in the base station according to state detection information of the ATS, current time, and preset configuration information.

In order to enable the PMU to acquire the state detection information of the ATS, a state detection line is added between the PMU and the ATS, so that the PMU may directly detect the state of the ATS. The method for the PMU to acquire the state detection information of the ATS is not limited to the method of adding the state detection line, and other methods may also be used to implement communication between the PMU and the ATS.

Figure 5:
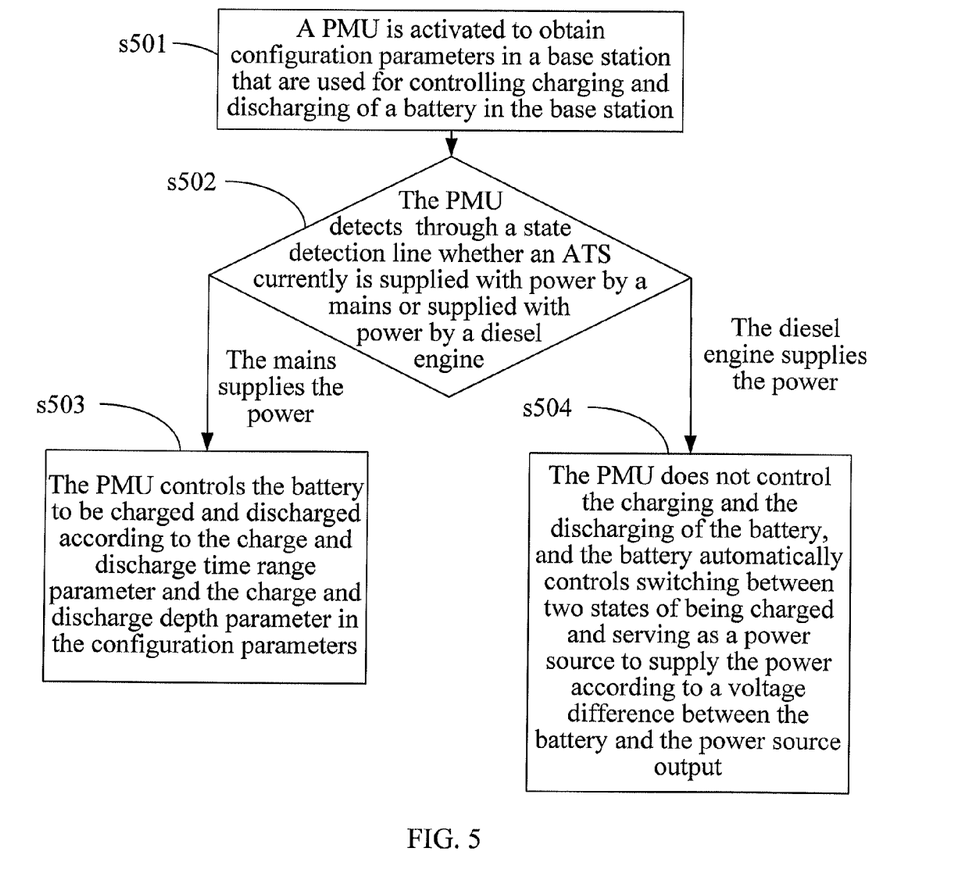
FIG. 5 is another flow chart of a method for controlling charging and discharging of a battery used in a base station according to an embodiment of the present invention.

A method for controlling charging and discharging of a battery used in a base station in the networking environment is shown in FIG. 5.

Step s501: A PMU is activated to obtain configuration parameters.

For example, the configuration parameters are used for controlling the charging and the discharging of the battery used in the base station.

Step s502: The PMU detects the ATS through a state detection line to judge whether the current power is supplied by a mains supply or by a diesel engine. If the mains supply supplies the power, step s503 is performed; if the diesel engine supplies the power, step s504 is performed.

For example, the PMU detects the ATS through the state detection line to judge whether the current power is supplied by the mains supply or by the diesel engine.

Step s503: The PMU controls the charging and the discharging of the battery used in the base station and the procedure ends according to the charge and discharge time range parameter and the charge and discharge depth parameter in the configuration parameters. The PMU controls disconnecting the base station from an external power supply when the battery is supplying power.

For example, a specific control procedure may refer to a procedure of steps s402 to s405 according to the embodiment in FIG. 4, and is not described again herein.

Figure 6:
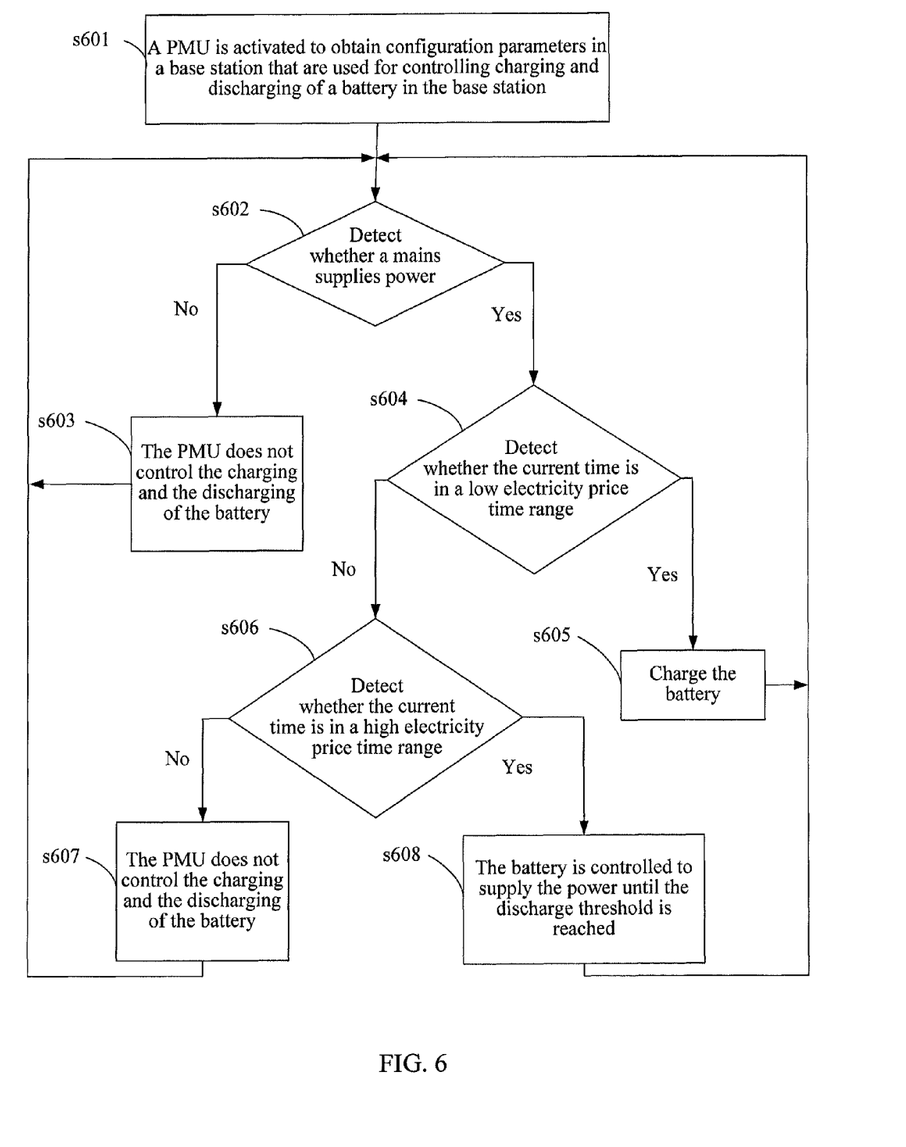
FIG. 6 is yet another flow chart of a method for controlling charging and discharging of a battery used in a base station according to an embodiment of the present invention.

Further, for example, the specific control procedure may be as shown in FIG. 6, which is described in detail later.

Step s504: The PMU does not control the charging and the discharging of the battery.

For example, the battery automatically controls switching between two states of being charged and serving as a power supply to supply power and the procedure ends, according to a difference between the voltage output by the battery and the voltage output by the power supply, and the base station is disconnected from an external power supply when the battery is supplying power.

In another embodiment of the present invention, the following is taken as an example to illustrate the process shown in FIG. 6 that the PMU controls the charging and the discharging of the battery used in the base station in steps s501 to s504 in detail: 24 hours in a day may be further divided into totally three time ranges of a high electricity price time range, a low electricity price time range, and another time range according to prices of electricity consumption of different time ranges.

Step s601: A PMU is activated to obtain configuration parameters for controlling the charging and the discharging of the battery used in the base station.

For example, a charge and discharge time range parameter of the configuration parameters including a high electricity price time range and a low electricity price time range is taken as an example, but the present invention is not limited thereto.

Step s602: The PMU detects whether the base station is currently supplied with power by a mains supply. If the base station is currently supplied with power by a mains supply, step s604 is performed; if the base station is not currently supplied with power by a mains supply, step s603 is performed.

For example, the judging step may be set to be automatically executed every particular time period, or automatically executed at preset time.

Step s603: The PMU does not control the charging and the discharging of the battery, the battery automatically controls switching between two states of being charged and serving as a power supply to supply the power, according to a difference between the voltage output by the battery and the voltage output by the power supply. The PMU controls disconnecting the base station from an external power supply when the battery is supplying power. The procedure returns to step s602.

Step s604: It is detected whether the current time is the low electricity price time range. If the current time is the low electricity price time range, step s605 is performed; if the current time is not the low electricity price time range, step s606 is performed.

For example, the PMU judges whether the current time is in the low price time range.

Step s605: The battery is charged. The procedure returns to step s602.

Step s606: It is detected whether the current time is the high electricity price time range. If the current time is not the high electricity price time range, step s607 is performed; if the current time is the high electricity price time range, step s608 is performed.

For example, the PMU judges whether the current time is in the high price time range.

Step s607: The PMU does not control the charging and the discharging of the battery.

For example, the battery automatically controls switching between two states of being charged and serving as a power supply to supply the power, according to a difference between the voltage output by the battery and the voltage output by the power supply, the base station is disconnected from an external power supply when the battery is supplying power, and the procedure returns to step s602.

Step s608: The battery is controlled to supply the power until the discharge threshold is reached, and the procedure returns to step s602.

The base station is disconnected from an external power supply when the battery is supplying power. The discharge threshold is a type of charge and discharge depth parameter; for example, the discharge threshold is set to be 60% of the maximal capacity of the battery.

By using the method according to the embodiments of the present invention, the parameters in the base station are set, and the charging and the discharging of the battery used in the base station are controlled according to current time and the configuration parameters. In this way, charging and discharging time of the battery used in the base station may be effectively controlled. Therefore, the electricity consumption cost of the base station is reduced, and in addition, the guidance of the national power utilization policy is conformed to. Further, other factors may also be considered for controlling the charging and the discharging of the battery used in the base station, such as the state of the ATS in the foregoing embodiments.

Figure 7:
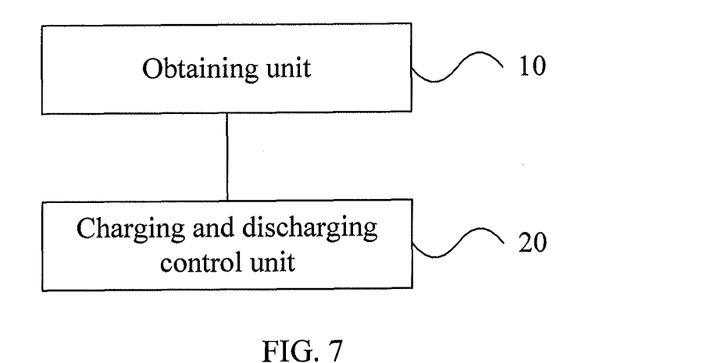
FIG. 7 is a schematic structural diagram of an apparatus for controlling charging and discharging of a battery used in a base station according to an embodiment of the present invention.

In an embodiment, the present invention further provides an apparatus for controlling charging and discharging of a battery used in a base station. The apparatus may be a PMU, or be set in a PMU, or be independent of a PMU. As shown in FIG. 7, the apparatus includes an obtaining unit 10 and a charging and discharging control unit 20.

The obtaining unit 10 is configured to obtain configuration parameters in the base station. For example, the configuration parameters are used for controlling the charging and the discharging of the battery used in the base station.

The charging and discharging control unit 20 is configured to control the charging and the discharging of the battery used in the base station according to current time and the configuration parameters obtained by the obtaining unit 10.

Figure 8:
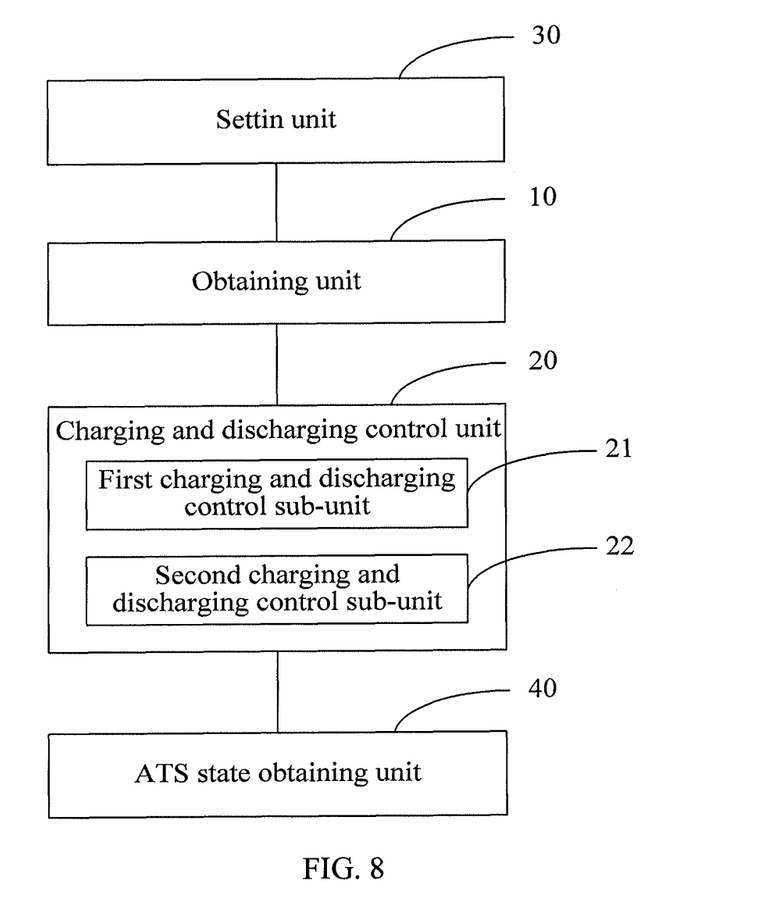
FIG. 8 is another schematic structural diagram of an apparatus for controlling charging and discharging of a battery used in a base station according to an embodiment of the present invention.

In another embodiment of the present invention, as shown in FIG. 8, the apparatus for controlling the charging and the discharging of the battery used in the base station may further include a setting unit 30.

The setting unit 30 is configured to set the configuration parameters in the base station, and provide the configuration parameters to the obtaining unit 10.

For example, the configuration parameters may include a charge and discharge time range parameter and a charge and discharge depth parameter, in which the charge and discharge time range parameter at least includes a first time range and a second time range; the charge and discharge depth parameter includes a discharge threshold. The setting unit 30 is further configured to set the parameters in the base station according to content received from an OMC platform.

In another embodiment of the present invention, the apparatus for controlling the charging and the discharging of the battery used in the base station may further include an ATS state obtaining unit 40.

The ATS state obtaining unit 40 is configured to obtain a state of an ATS connected with the base station, in which the ATS is configured to control a type of a power supply for supplying the power to the base station. Specifically, the ATS state obtaining unit 40 may be configured to obtain the state of the ATS through a state detection line connected with the ATS. In another embodiment of the present invention, the state of the ATS may include one of types of supplying the power by a mains supply and supplying the power by a diesel engine.

In another embodiment of the present invention, the charging and discharging control unit 20 may include: a first charging and discharging control sub-unit 21 or a second charging and discharging control sub-unit 22.

The first charging and discharging control sub-unit 21 is configured to control the battery used in the base station to be charged until the battery is full charged, if it is judged that the current time is in the first time range; and control the battery used in the base station to supply power until the discharge threshold is reached, if it is judged that the current time is in the second time range according to the current time and the configuration parameters, and further configured to control to disconnect the base station from an external power supply when the battery is supplying power.

The second charging and discharging control sub-unit 22 is configured to control the battery used in the base station to be charged until the battery is full charged, if it is judged that the current time is in the first time range; and control the battery used in the base station to supply power until the discharge threshold is reached, if it is judged that the current time is in the second time range according to the current time and the configuration parameters when the state of the ATS obtained by the ATS state obtaining unit 40 is supplying the power by the mains supply. The second charging and discharging control sub-unit 22 is further configured to control to disconnect the base station from the external power supply when the battery is supplying power.

In another embodiment of the present invention, the charging and discharging control unit 20 may further include a first judgment unit 211 and a first charging and discharging control sub-unit 213.

The first judgment unit 211 is configured to judge whether the current time is in the first time range or is in the second time range according to the current time and the configuration parameters.

The first charging and discharging control sub-unit 213 is configured to control the battery used in the base station to be charged until the battery is full charged, if the first judgment unit 211 judges that the current time is in the first time range; and control the battery used in the base station to supply power until the discharge threshold is reached, if the first judgment unit 211 judges that the current time is in the second time range, and further configured to control to disconnect the base station from an external power supply when the battery is supplying power.

In another embodiment of the present invention, the charging and discharging control unit 20 may further include a second judgment unit 211 and a second charging and discharging control sub-unit 213.

The second judgment unit 221 is configured to judge whether a current state is a type of supplying the power by the mains supply or a type of supplying the power by the battery according to a result obtained by the ATS state obtaining unit 40, and judge whether the current time is in the first time range or is in the second time range according to the current time and the configuration parameters when it is judged that the current state is a type of supplying the power by the mains supply.

The second charging and discharging control sub-unit 223 is configured to control the battery used in the base station to be charged until the battery is full charged, if the second judgment unit 221 judges that the current state is a type of supplying the power by the mains supply, and the current time is in the first time range; and control the battery used in the base station to supply power until the discharge threshold is reached, if the second judgment unit 211 judges that the current state is a type of supplying the power by the mains supply, and the current time is in the second time range, and further configured to control to disconnect the base station from an external power supply when the battery is supplying power.

The specific working procedures of the apparatus and the units are as described in the method embodiments in FIG. 2 to FIG. 6, and is not described again herein.

By using the apparatus according to the embodiments of the present invention, detecting the current power supply state of the base station, and controlling the charging and the discharging of the battery used in the base station according to the current power supply state of the base station, charging and discharging time of the battery used in the base station is capable of being effectively controlled, so as to reduce the electricity consumption cost of the base station and conform to the guidance of the national power utilization policy. Further, the state of the ATS may serve as one factor in the current power supply state of the base station.

For the purpose of clarity, the communication network in the above embodiments is described to include only one base station. However, it should be understood that, the communication network may include a plurality of base stations in practice.

In the embodiments provided in the present application, it should be understood that the disclosed system, apparatus, and method may be implemented in other ways without departing from the spirit and scope of the present application. For example, the apparatus embodiments are merely exemplary. For example, the division of the units is only a type of logical function division, and another division manner may be provided in actual implementation. For example, a plurality of units or components may be combined or may be integrated into another system, or some features may be omitted or are not executed. Units described as separate components may be or may not be physically separated. Components shown as units may be or may not be physical units, that is, may be integrated or distributed on a plurality of network units. Some or all of the modules may be selected to achieve the objective of the solutions of the embodiments according to actual demands. Persons of ordinary skill in the art may understand and implement the present invention without creative efforts.

In addition, the schematic diagrams of the described system, apparatus, and method, and schematic diagrams of different embodiments may be combined or integrated with other systems, modules, technologies, or methods without departing from the scope of the present application. Furthermore, the shown or discussed mutual coupling, direct coupling, or communication connection may be an indirect coupling or communication connection implemented by using interfaces, apparatuses, or units. Said coupling or communication connection may be implemented in electrical, mechanical, or other proper connection mode. Through the descriptions of the preceding embodiments, those skilled in the art may understand that the present invention may be implemented by using hardware only or by using software and a necessary universal hardware platform. Based on such understandings, the technical solutions of the present invention may be embodied in the form of a software product. The software product may be stored in a nonvolatile storage medium, which may be any medium that is capable of storing program codes such as a Universal Serial Bus (USB) flash drive, a removable hard drive, a Read-Only Memory (ROM) or a Random Access Memory (RAM), a magnetic disk, or an optical disk. The software product includes several instructions that enable a computer apparatus (personal computer, server, or network apparatus) to execute all or a part of steps of the methods provided in the embodiments of the present invention.

It should be noted that the above descriptions are merely preferred embodiments of the present invention, and persons of ordinary skill in the art may make modifications and variations without departing from the principle of the invention, and all such modifications and variations should also be covered by the protection scope of the present invention.

What is claimed is:

1. A method for controlling charging and discharging of a battery in a mobile communication base station, comprising:
    setting configuration parameters in the mobile communication base station configured to control the charging and the discharging of the battery in the mobile communication base station, wherein the configuration parameters comprise a charge and discharge time range parameter and a charge and discharge depth parameter,
    obtaining the configuration parameters in the mobile communication base station; and
    controlling the charging and the discharging of the battery in the mobile communication base station according to current time and the configuration parameters,
    wherein the charge and discharge time range parameter comprises a first time range and a second time range with different prices of electricity consumption; and the charge and discharge depth parameter comprises a discharge threshold,
    wherein a price of electricity consumption in the first time range is lower than a price of electricity consumption in the second time range, and the controlling the charging and the discharging of the battery in the mobile communication base station according to the current time and the configuration parameters comprises:
    charging the battery in the mobile communication base station until the battery is full charged, if it is determined that the current time is in the first time range; and
    controlling the battery in the mobile communication base station to supply power until the discharge threshold is reached, if it is determined that the current time is in the second time range, and disconnecting the mobile communication base station from an external power supply when the battery is supplying power.

2. The method according to claim 1, wherein the setting the configuration parameters in the base station comprises: setting the configuration parameters according to content received from an operation maintenance center (OMC) platform.

3. The method according to claim 1, wherein after the obtaining the configuration parameters in the base station that are for controlling the charging and the discharging of the battery in the base station, the method further comprises:
    obtaining a state of an automatic transfer system (ATS) connected with the base station through a state detection line between a Power Management Unit (PMU) and the ATS, wherein the ATS is configured to control a type of a power supply for supplying the power to the base station; and
    the controlling the charging and the discharging of the battery in the base station according to the current time and the configuration parameters comprises: controlling the charging and the discharging of the battery in the base station according to the current time, the configuration parameters, and the obtained state of the ATS.

4. The method according to claim 3, wherein the obtaining the state of the ATS connected with the base station comprises: obtaining the state of the ATS through a state detection line connected with the ATS.

5. The method according to claim 3, wherein the state of the ATS comprises one of types of supplying the power by a mains supply and supplying the power by a diesel engine.

6. The method according to claim 5, wherein the controlling the charging and the discharging of the battery in the base station according to the current time, the configuration parameters, and the obtained state of the ATS comprises:
    when the state of the ATS indicates the type of supplying the power by the mains supply, charging the battery in the base station until the battery is full charged, if it is determined that the current time is in the first time range; and
    controlling the battery in the base station to supply power until the discharge threshold is reached, if it is determined that the current time is in the second time range, and disconnecting the base station from an external power supply when the battery is supplying power.

7. An apparatus for controlling charging and discharging of a battery in a mobile communication base station, comprising:
an obtaining unit, configured to obtain configuration parameters in a mobile communication base station that are configured to control the charging and the discharging of a battery in the mobile communication base station;
a charging and discharging control unit, configured to control the charging and the discharging of the battery in the mobile communication base station according to current time and the configuration parameters obtained by the obtaining unit; and
a setting unit, configured to set the configuration parameters in the mobile communication base station configured to control the charging and the discharging of the battery, wherein the configuration parameters comprise a charge and discharge time range parameter and a charge and discharge depth parameter;
wherein the charge and discharge time range parameter comprises a first time range and a second time range with different prices of electricity consumption; and the charge and discharge depth parameter comprises a discharge threshold,
wherein a price of electricity consumption in the first time range is lower than a price of electricity consumption in the second time range, the charging and discharging control unit comprises a first charging and discharging control sub-unit, configured to charge the battery in the mobile communication base station until the battery is full charged, if it is determined that the current time is in the first time range; and control the battery in the mobile communication base station to supply power until the discharge threshold is reached, if it is determined that the current time is in the second time range according to the current time and the configuration parameters, and disconnect the mobile communication base station from an external power supply when the battery is supplying power.

8. The apparatus according to claim 7, wherein the setting unit is further configured to set the configuration parameters in the base station according to content received from an operation maintenance center (OMC) platform.

9. The apparatus according to claim 7, wherein the apparatus further comprises:
an automatic transfer system (ATS) state obtaining unit, configured to obtain a state of an ATS connected with the base station through a state detection line between a Power Management Unit (PMU) and the ATS, wherein the ATS is configured to control a type of a power supply for supplying the power to the base station,
wherein the charging and discharging control unit comprises a second charging and discharging control sub-unit, configured to charge the battery in the base station until the battery is full charged, if it is determined that the current time is in the first time range; and control the battery in the base station to supply power until the discharge threshold is reached, if it is determined that the current time is in the second time range according to the current time and the configuration parameters when the state of the ATS indicates a type of supplying power by a mains supply, and disconnect the base station from an external power supply when the battery is supplying power.

10. A system for controlling charging and discharging of a battery in a mobile communication base station, comprising:
an apparatus, configured to obtain configuration parameters in a mobile communication base station that are for controlling the charging and the discharging of a battery in the mobile communication base station; and to control the charging and the discharging of the battery in the mobile communication base station according to current time and the configuration parameters,
wherein the apparatus is further configured to set the configuration parameters in the mobile communication base station that are for controlling the charging and the discharging of the battery in the mobile communication base station, wherein the configuration parameters comprise a charge and discharge time range parameter and a charge and discharge depth parameter,
wherein the charge and discharge time range parameter comprises a first time range and a second time range with different prices of electricity consumption; and the charge and discharge depth parameter comprises a discharge threshold,
wherein a price of electricity consumption in the first time range is lower than a price of electricity consumption in the second time range, and the apparatus is further configured to charge the battery in the mobile communication base station until the battery is full charged, if it is determined that the current time is in the first time range; and control the battery in the mobile communication base station to supply power until the discharge threshold is reached, if it is determined that the current time is in the second time range according to the current time and the configuration parameters, and disconnect the mobile communication base station from an external power supply when the battery is supplying power.

11. The system according to claim 10, wherein the apparatus is further configured to obtain a state of an ATS connected with the base station, wherein the ATS is configured to control a type of a power supply for supplying the power to the base station, and configured to charge the battery in the base station until the battery is full charged, if it is determined that the current time is in the first time range; and control the battery in the base station to supply power until the discharge threshold is reached, if it is determined that the current time is in the second time range according to the current time and the configuration parameters when the state of the ATS indicates a type of supplying power by a mains supply, and disconnect the base station from an external power supply when the battery is supplying power.

12. A non-transitory machine-readable storage medium having stored thereon, a computer program comprising at least one code section for distributing data, the at least one code section being executable by a machine for causing the machine to perform acts of:
setting configuration parameters in a mobile communication base station configured to control the charging and the discharging of a battery in the mobile communication base station, wherein the configuration parameters comprise a charge and discharge time range parameter and a charge and discharge depth parameter,
obtaining configuration parameters in a mobile communication base station configured to control the charging and the discharging of the battery in the mobile communication base station;
controlling the charging and the discharging of the battery in the mobile communication base station according to current time and the configuration parameters; and wherein the charge and discharge time range parameter comprises a first time range and a second time range with different prices of electricity consumption; and the charge and discharge depth parameter comprises a discharge threshold, wherein a price of electricity consumption in the first time range is lower than a price of electricity consumption in the second time range, and the act of controlling the charging and the discharging of the battery in the mobile communication base station according to the current time and the configuration parameters comprises:

charging the battery in the mobile communication base station until the battery is full charged, if it is determined that the current time is in the first time range; and controlling the battery in the mobile communication base station to supply power until the discharge threshold is reached, if it is determined that the current time is in the second time range, and disconnecting the mobile communication base station from an external power supply when the battery is supplying power.

* * * * *